(12) United States Patent
Kidani et al.

(10) Patent No.: US 12,382,070 B2
(45) Date of Patent: Aug. 5, 2025

(54) IMAGE DECODING DEVICE, IMAGE DECODING METHOD, AND PROGRAM

(71) Applicant: KDDI CORPORATION, Tokyo (JP)

(72) Inventors: Yoshitaka Kidani, Fujimino (JP); Kyohei Unno, Fujimino (JP); Kei Kawamura, Fujimino (JP); Sei Naito, Fujimino (JP)

(73) Assignee: KDDI CORPORATION, Tokyo (JP)

( * ) Notice: Subject to any disclaimer, the term of this patent is extended or adjusted under 35 U.S.C. 154(b) by 551 days.

(21) Appl. No.: 17/615,563

(22) PCT Filed: Jun. 11, 2020

(86) PCT No.: PCT/JP2020/022976
§ 371 (c)(1),
(2) Date: Jun. 10, 2022

(87) PCT Pub. No.: WO2020/262011
PCT Pub. Date: Dec. 30, 2020

(65) Prior Publication Data
US 2023/0199206 A1    Jun. 22, 2023

(30) Foreign Application Priority Data
Jun. 24, 2019    (JP) .................................. 2019-116786

(51) Int. Cl.
*H04N 19/44* (2014.01)
*H04N 19/169* (2014.01)
*H04N 19/176* (2014.01)
*H04N 19/61* (2014.01)

(52) U.S. Cl.
CPC ........... *H04N 19/44* (2014.11); *H04N 19/176* (2014.11); *H04N 19/619* (2014.11)

(58) Field of Classification Search
CPC .............................. H04N 19/44; H04N 19/619
USPC ..................................................... 375/240.25
See application file for complete search history.

(56) References Cited

U.S. PATENT DOCUMENTS

2019/0149822 A1    5/2019 Kim et al.

FOREIGN PATENT DOCUMENTS

| JP | 7049434 B2 | 4/2022 | |
| WO | 2017/192705 A1 | 11/2017 | |
| WO | WO-2020211776 A1 * | 10/2020 | ........... H04N 19/102 |

OTHER PUBLICATIONS

Extended European Search Repoted dated Jun. 23, 2023, from corresponding European Application No. 20904382.7.
M-S Chiang et al: "CE10-related: Syntax redundancy removal in triangle prediction" , 125. MPEG Meeting; Jan. 14, 2019-Jan. 18, 2019; Marrakech; (Motion Picture Expert Group or ISO/IEC JTC1/SC29/WG11), No. m45451 Jan. 9, 2019 (Jan. 9, 2019), XP030213344.

(Continued)

*Primary Examiner* — Jeffery A Williams
(74) *Attorney, Agent, or Firm* — Troutman Pepper Locke LLP

(57) ABSTRACT

An image decoding device includes an inverse transform unit configured to generate a prediction residual signal by inverse transform, the inverse transform unit is configured to control a method of decoding a secondary transform index of a target block according to information indicating a position where a non-zero coefficient is generated in the target block.

3 Claims, 13 Drawing Sheets

(56) References Cited

OTHER PUBLICATIONS

Gary J Sullivan; Jens-Rainer Ohm; Woo-Jin Han; Thomas Wiegand: "Overview of the High Efficiency Video Coding (HEVC) Standard", IEEE Transactions On Circuits and Systems for Video Technology, Jan. 1, 2012 (Jan. 1, 2012), pp. 1-19, XP055045358.
Wang (Kwai) X et al: "CE4-related: An improved method for triangle merge list construction", 14. Jvet Meeting; Mar. 19, 2019-Mar. 27, 2019; Geneva; (The Joint Video Exploration Team of ISO/IEC JTC1/SC29/WG11 and ITU-T SG.16), No. JVET-N0340 Mar. 20, 2019 (Mar. 20, 2019), XP030203946.
Notice of Reasons for Refusal dated Dec. 5, 2023, from corresponding Japanese Application No. JP2022-187830.
International Search Report issued in PCT/JP2020/022976 dated Sep. 1, 2020.
Seregin, V., et al. "EE2: Grouped signalling for transform" JVET-D0112r1, pp. 1-6 (Oct. 2016).
Koo, M., et al. "CE6: Reduced Secondary Transform (RST) (CE6-3.1)" JVET-N0193, pp. 1-21 (Mar. 2019).
Bross, B., et al. "Versatile Video Coding (Draft 5)", JVET-N 1001-v8, pp. 1-13 (Mar. 2019).
Chen, J. et al., "Algorithm description for Versatile Video Coding and Test Model 5 (VTM 5)", JVET-N 1002, pp. 1-5, (Mar. 2019).
Siekmann, M., et al. "CE6-2.1: Simplification of Low Frequency Non-Separable Transform", JVET-O0094, pp. 1-9 (Jul. 2019).
Kidani, Y., et al. "CE6-related: Signalling of Low Frequency Non-Separable Transform", JVET-O0410-v3, pp. 1-10 (Jul. 2019).
Jung, J., et al. "Non-CE6: Simplified LFNST Signalling", JVET-00472-v2, pp. 1-6 (Jul. 2019).
Extended European Search Repoted dated Apr. 24, 2023, from corresponding European Application No. 20832640.5.
C-W Hsu (Mediatek) et al: "Description of 1-3 SDR video coding technology proposal by MediaTek", 10. JVET Meeting; Apr. 10, 2018-Apr. 20, 2018; San Diego; (The Joint Video Exploration Team of ISO/IEC JTC1/SC29/ WG11 and ITU-T SG.16), No. JVET-J0018 Apr. 11, 2018 (Apr. 11, 2018), XP030248125.

* cited by examiner

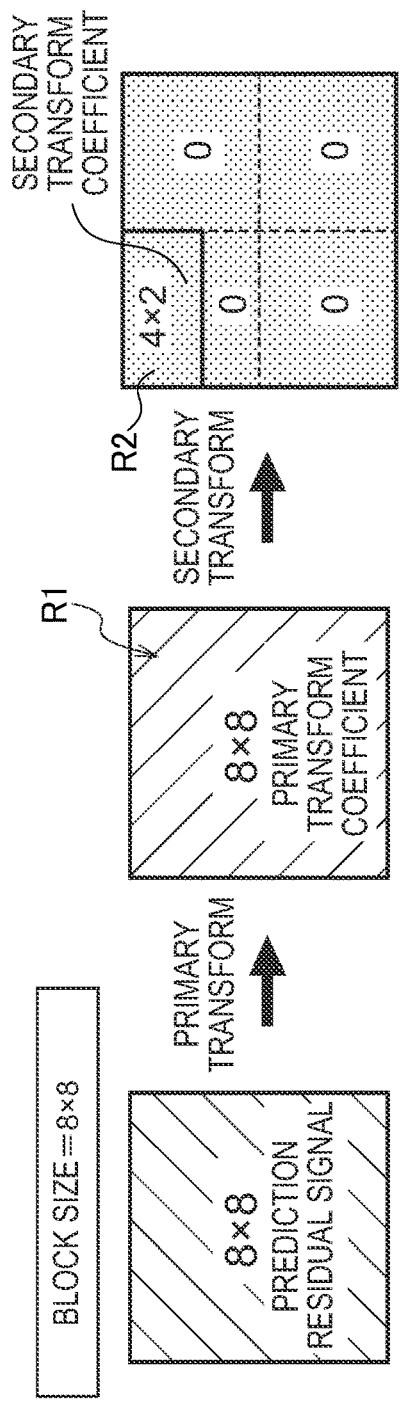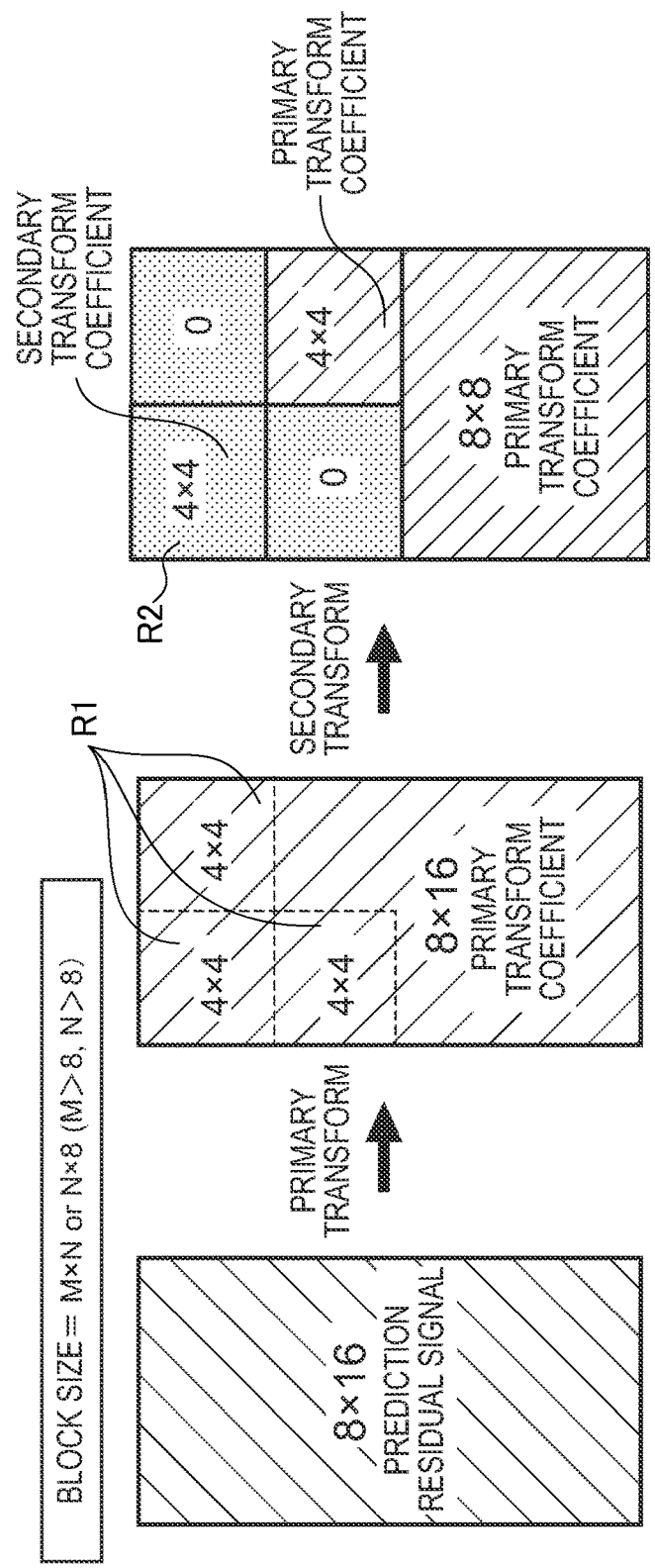
FIG. 6A
FIG. 6B

FIG. 7
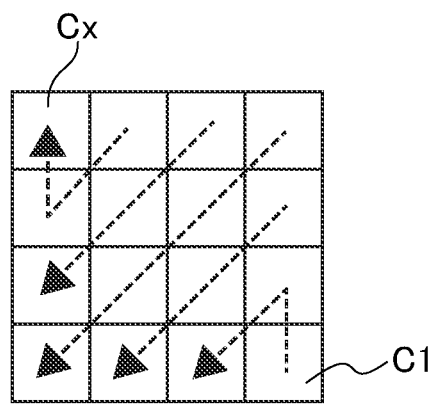
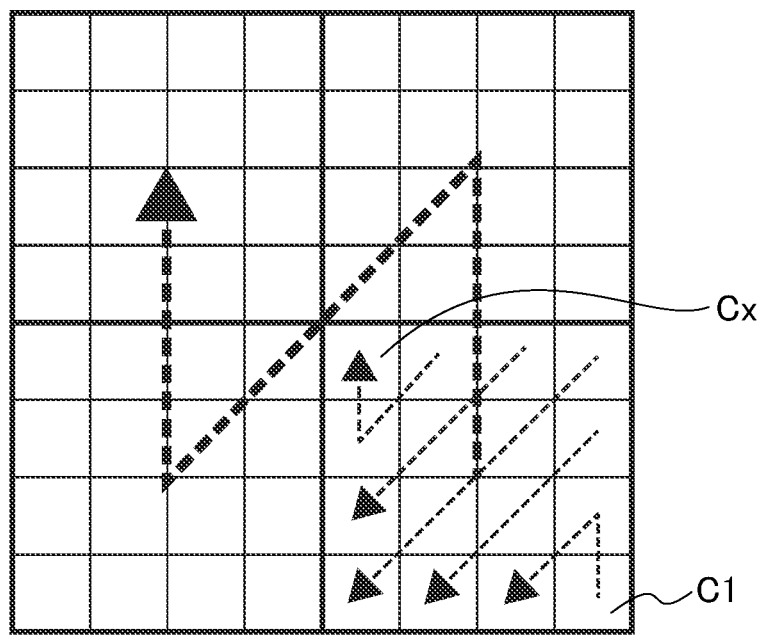

FIG. 11

| 0 SCANNING ORDER | 2 | 5 | 9 0 |
|---|---|---|---|
| 1 | 4 | 8 0 | 12 0 |
| 3 | 7 | 11 0 | 14 0 |
| 6 | 10 0 | 13 0 | 15 0 |

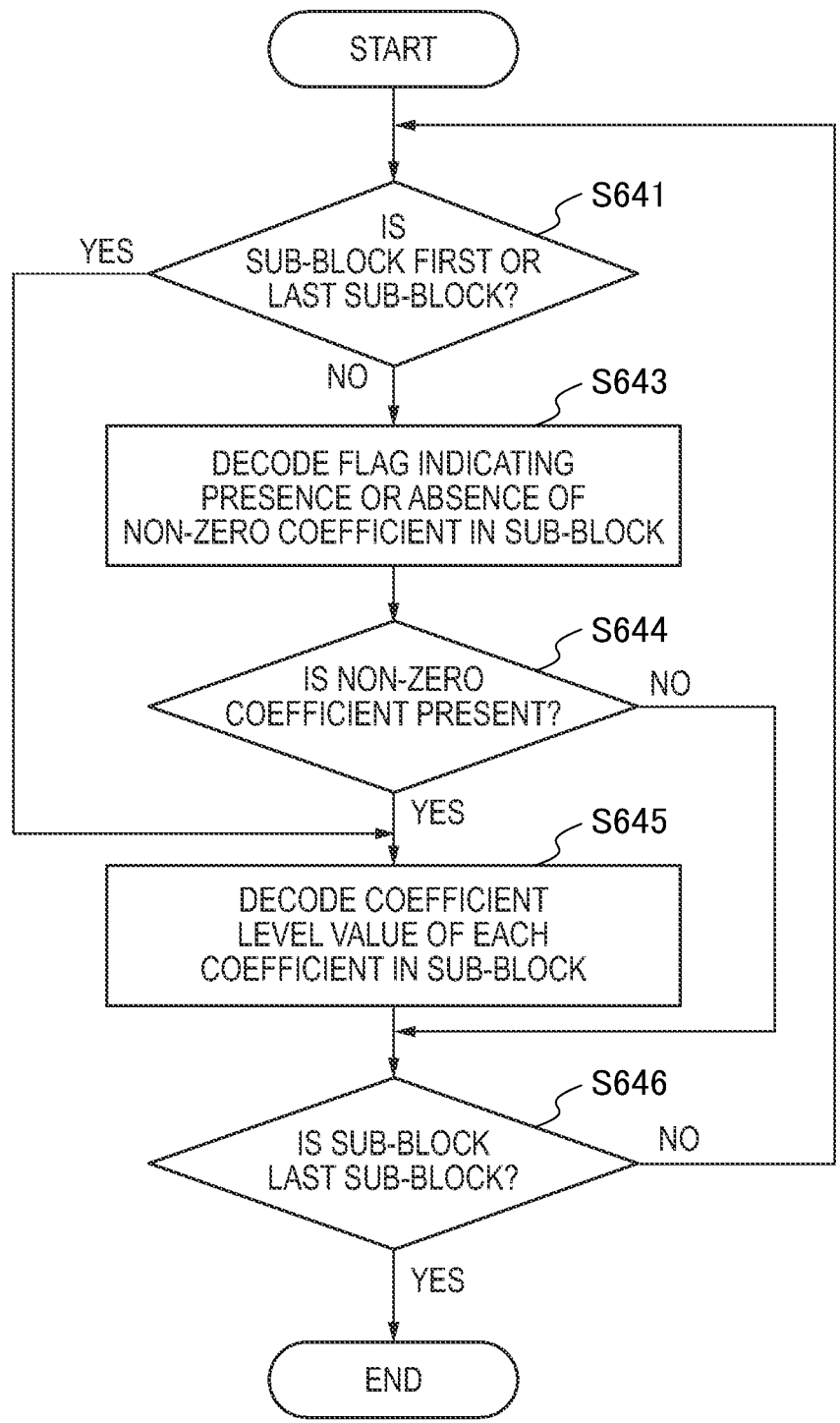

IMAGE DECODING DEVICE, IMAGE DECODING METHOD, AND PROGRAM

CROSS REFERENCE TO RELATED APPLICATIONS

The present application is a U.S. National Phase of International Patent No. PCT/JP2020/022976, filed on Jun. 11, 2020, which claims the benefit of Japanese patent application No. 2019-116786 filed on Jun. 24, 2019. The entire contents of which are hereby incorporated by reference.

TECHNICAL FIELD

The present invention relates to an image decoding device, an image decoding method, and a program.

BACKGROUND

Conventionally, techniques called reduced secondary transform (RST) (see CE6: Reduced Secondary Transform (RST) (CE6-3.1), JVET-N0193) and low-frequency non-separable transform (LENST) (see Versatile Video Coding (Draft 5), JVET-N 1001) for performing secondary transform on a coefficient after primary transform are known.

However, in the conventional techniques described above, a plurality of types of counters for counting the number of non-zero coefficients are provided at the time of decoding coefficients, and whether or not to apply secondary transform is determined based on a value of the counter. Therefore, it is necessary to add coefficient counting processing only to determine whether or not to apply the secondary transform. Coefficient decoding processing is processing requiring a high throughput, but there is a problem that a processing load increases by executing additional processing.

Therefore, the present invention has been made in view of the above-described problems, and an object of the present invention is to provide an image decoding device, an image decoding method, and a program, in which additional processing for determining whether or not to apply secondary transform can be omitted and high-speed processing can be expected.

SUMMARY

The first aspect of the present invention is summarized as an image decoding device including: an inverse transform unit configured to generate a prediction residual signal by inverse transform, wherein the inverse transform unit is configured to determine whether or not to apply secondary transform for a target block, and control a method of decoding a transform coefficient according to the result of the determination.

The second aspect of the present invention is summarized as an image decoding device including: an inverse transform unit configured to generate a prediction residual signal by inverse transform, wherein the inverse transform unit is configured to control a method of decoding a secondary transform index of a target block according to a size of the target block.

The third aspect of the present invention is summarized as an image decoding device including: an inverse transform unit configured to generate a prediction residual signal by inverse transform, wherein the inverse transform unit is configured to control a method of decoding a secondary transform index of a target block according to information indicating a position where a non-zero coefficient is generated in the target block.

In the third aspect, the inverse transform unit is configured not to decode the secondary transform index of the target block in a case where the information indicating the position where the non-zero coefficient is generated in the target block indicates a coefficient position where the non-zero coefficient is not generatable when the secondary transform is applied to the target block.

In the third aspect, the inverse transform unit is configured not to decode the secondary transform index of the target block in a case where the information indicating the position where the non-zero coefficient is generated in the target block indicates a coefficient position of a direct current component of the target block.

The fourth aspect of the present invention is summarized as an image decoding device including: an inverse transform unit configured to generate a prediction residual signal by inverse transform, wherein the inverse transform unit is configured to control a method of decoding a secondary transform index of a target block according to a flag indicating whether or not a non-zero coefficient is generated in the target block.

The fifth aspect of the present invention is summarized as an image decoding device including: an inverse transform unit configured to generate a prediction residual signal by inverse transform, wherein the inverse transform unit is configured to control a method of decoding a secondary transform index of a target block according to a flag indicating whether or not a non-zero coefficient is generated in a sub-block in the target block.

In the fifth aspect, the inverse transform unit is configured not to decode the secondary transform index of the target block in a case where the flag indicating whether or not the non-zero coefficient is generated in the sub-block indicates that the non-zero coefficient is generated in a sub-block in which the non-zero coefficient is not generatable when the secondary transform is applied to the target block.

The sixth aspect of the present invention is summarized as an image decoding method including the step of generating a prediction residual signal by inverse transform, wherein the step includes: determining whether or not to apply secondary transform for a target block, and controlling a method of decoding a transform coefficient according to the result of the determination.

The seventh aspect of the present invention is summarized as a program for causing a computer to function as an image decoding device, wherein the image decoding device includes: an inverse transform unit configured to generate a prediction residual signal by inverse transform, wherein the inverse transform unit is configured to determine whether or not to apply secondary transform for a target block, and control a method of decoding a transform coefficient according to the result of the determination.

According to the present invention, it is possible to provide an image decoding device, an image decoding method, and a program, in which additional processing for determining whether or not to apply secondary transform can be omitted and high-speed processing can be expected.

BRIEF DESCRIPTION OF DRAWINGS

FIG. 6 is a diagram for describing an example of functions of the inverse transform/inverse quantization unit 220 of the image decoding device 200 according to the embodiment.

FIG. 7 is a diagram for describing an example of functions of the inverse transform/inverse quantization unit 220 of the image decoding device 200 according to the embodiment.

FIG. 11 is a diagram for describing a second embodiment.

FIG. 13 is a flowchart illustrating an example of the method of determining whether or not to apply the secondary transform and the coefficient decoding method in the image decoding device 200 according to the third embodiment.

DETAILED DESCRIPTION

Figure 1:
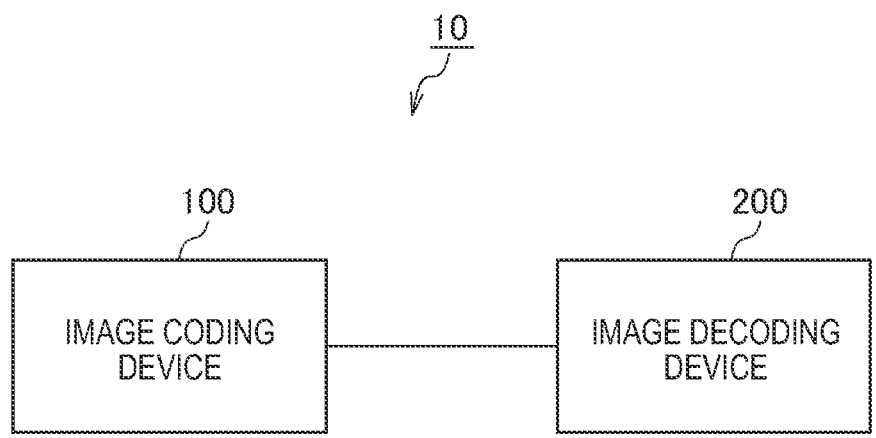
FIG. 1 is a diagram illustrating an example of a configuration of an image processing system 1 according to an embodiment.

Hereinafter, an image processing system 10 according to a first embodiment of the present invention will be described with reference to FIGS. 1 to 9. FIG. 1 is a diagram illustrating the image processing system 10 according to the present embodiment.

As illustrated in FIG. 1, the image processing system 10 according to the present embodiment includes an image coding device 100 and an image decoding device 200.

The image coding device 100 is configured to generate coded data by coding an input image signal. The image decoding device 200 is configured to generate an output image signal by decoding the coded data.

The coded data may be transmitted from the image coding device 100 to the image decoding device 200 via a transmission path. The coded data may be stored in a storage medium and then provided from the image coding device 100 to the image decoding device 200.

Figure 2:
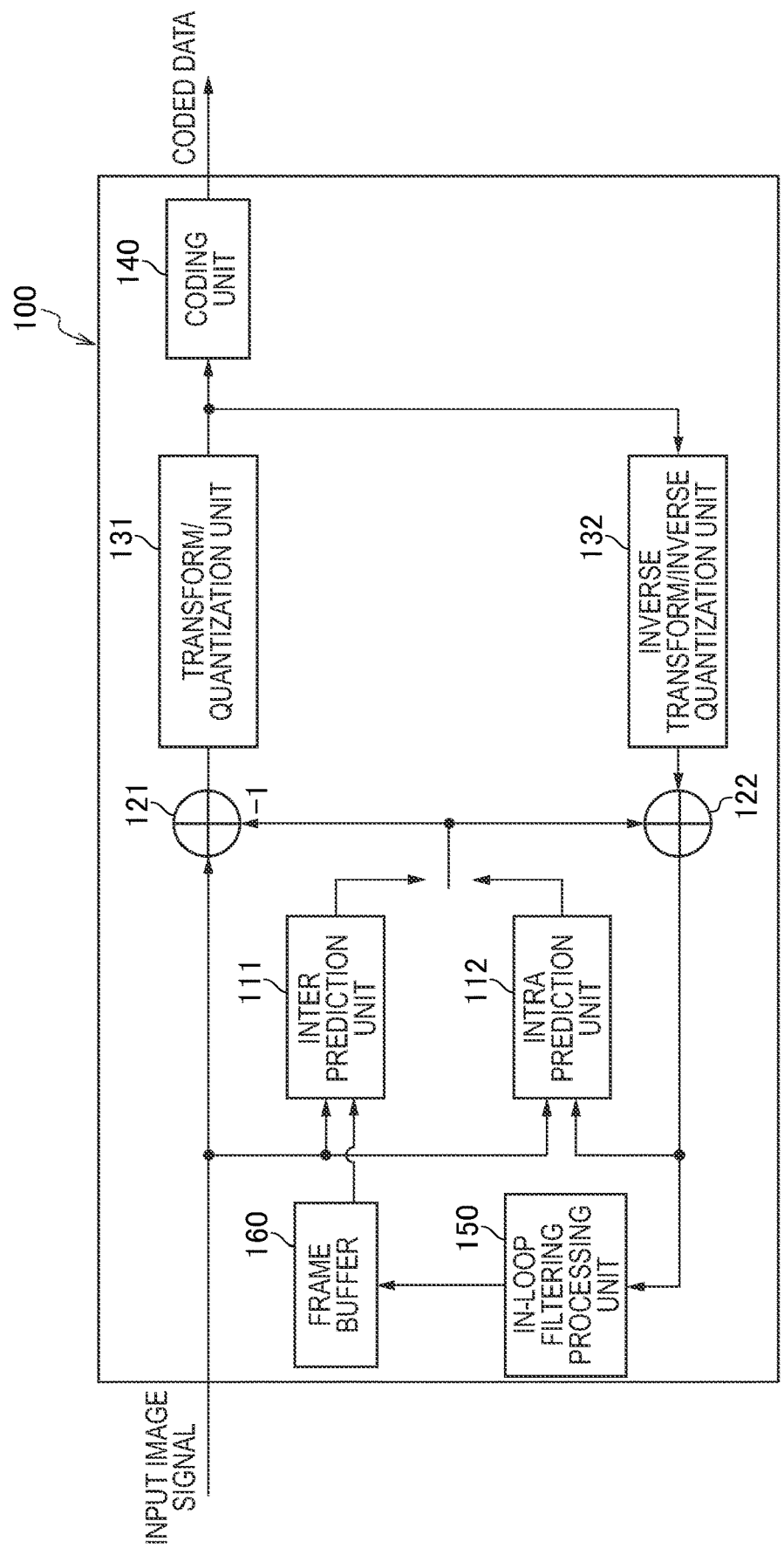
FIG. 2 is a diagram illustrating an example of functional blocks of an image coding device 100 according to the embodiment.

Hereinafter, the image coding device 100 according to the present embodiment will be described with reference to FIG. 2. FIG. 2 is a diagram illustrating an example of functional blocks of the image coding device 100 according to the present embodiment.

As illustrated in FIG. 2, the image coding device 100 includes an inter prediction unit 111, an intra prediction unit 112, a subtractor 121, an adder 122, a transform/quantization unit 131, an inverse transform/inverse quantization unit 132, a coding unit 140, an in-loop filtering processing unit 150, and a frame buffer 160.

The inter prediction unit 111 is configured to generate a prediction signal by inter prediction (inter-frame prediction).

Specifically, the inter prediction unit 111 is configured to specify a reference block included in a reference frame by comparing a frame to be coded (hereinafter, referred to as a target frame) with the reference frame stored in the frame buffer 160, and determine a prediction motion vector for the specified reference block.

The inter prediction unit 111 is configured to generate the prediction signal included in a prediction block for each prediction block based on the reference block and the motion vector. The inter prediction unit 111 is configured to output the prediction signal to the subtractor 121 and the adder 122. Here, the reference frame is a frame different from the target frame.

The intra prediction unit 112 is configured to generate a prediction signal by intra prediction (intra-frame prediction).

Specifically, the intra prediction unit 112 is configured to specify the reference block included in the target frame, and generate the prediction signal for each prediction block based on the specified reference block. Furthermore, the intra prediction unit 112 is configured to output the prediction signal to the subtractor 121 and the adder 122.

Here, the reference block is a block referred to for a prediction target block (hereinafter, referred to as the target block). For example, the reference block is a block adjacent to the target block.

The subtractor 121 is configured to subtract the prediction signal from the input image signal, and output a prediction residual signal to the transform/quantization unit 131. Here, the subtractor 121 is configured to generate the prediction residual signal that is a difference between the prediction signal generated by intra prediction or inter prediction and the input image signal.

The adder 122 is configured to add the prediction signal to the prediction residual signal output from the inverse transform/inverse quantization unit 132 to generate a pre-filtering decoded signal, and output the pre-filtering decoded signal to the intra prediction unit 112 and the in-loop filtering processing unit 150.

Here, the pre-filtering decoded signal constitutes the reference block used by the intra prediction unit 112.

The transform/quantization unit 131 is configured to perform transform processing for the prediction residual signal and acquire a coefficient level value. Furthermore, the transform/quantization unit 131 may be configured to perform quantization of the coefficient level value.

Here, the transform/quantization unit 131 is configured to output a quantization index in a case where the quantization of the coefficient level value is performed. Hereinafter, the output of the transform/quantization unit 131 is described as the coefficient level value regardless of whether or not quantization is applied.

Here, the transform processing is processing of transforming the prediction residual signal into a frequency component signal. In such transform processing, a base pattern (transformation matrix) corresponding to discrete cosine transform (DCT) may be used, or a base pattern (transformation matrix) corresponding to discrete sine transform (DST) may be used.

Note that the transform processing may be executed a plurality of times before the quantization is performed. As an example, secondary transform for executing the second transform processing will be described later.

The inverse transform/inverse quantization unit 132 is configured to perform inverse transform processing for the coefficient level value output from the transform/quantization unit 131. Here, the inverse transform/inverse quantization unit 132 may be configured to perform inverse quantization of the coefficient level value prior to the inverse transform processing.

Here, the inverse transform processing and the inverse quantization are performed in a reverse procedure to the transform processing and the quantization performed by the transform/quantization unit 131.

The coding unit 140 is configured to code the coefficient level value from the output transform/quantization unit 131 and output coded data.

Here, for example, the coding is entropy coding in which coefficients of the target block (coding block or transform block) are counted and codes of different lengths are assigned based on a probability of generation of the coefficient level value. A coefficient counting method will be described later.

Furthermore, the coding unit 140 is configured to code control data used in decoding processing in addition to the coefficient level value.

Here, the control data may include size data such as a coding block (coding unit (CU)) size, a prediction block (prediction unit (PU)) size, and a transform block (transform unit (TU)) size.

The in-loop filtering processing unit 150 is configured to execute filtering processing on the pre-filtering decoded signal output from the adder 122 and output the filtered decoded signal to the frame buffer 160.

Here, for example, the filtering processing is deblocking filtering processing for reducing distortion occurring at a boundary portion of a block (coding block, prediction block, or transform block).

The frame buffer 160 is configured to accumulate the reference frames used by the inter prediction unit 111. Here, the filtered decoded signal constitutes the reference frame used by the inter prediction unit 111.

(Transform/Quantization Unit 131)

Figure 3:
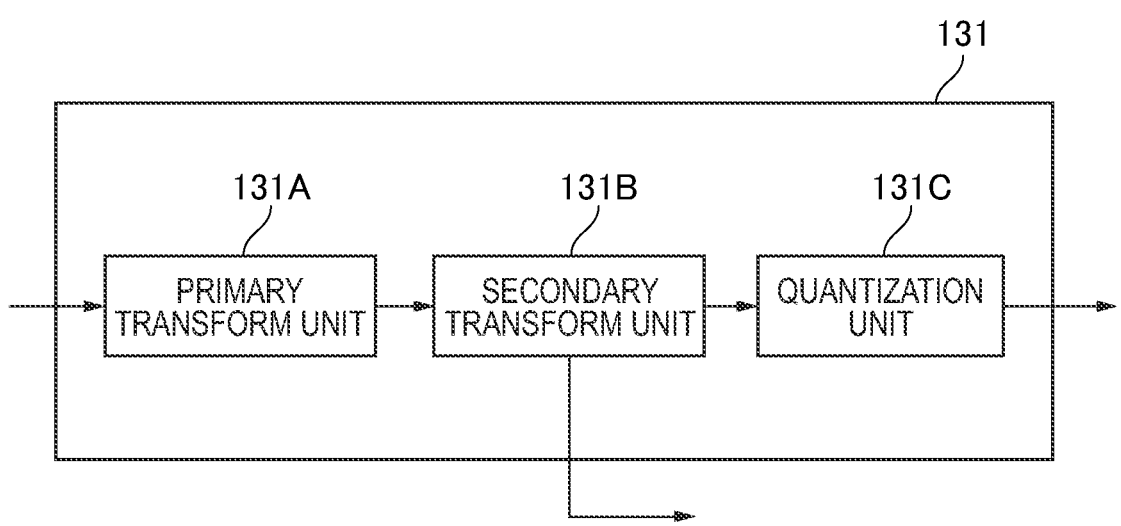
FIG. 3 is a diagram illustrating an example of functional blocks of a transform/quantization unit 131 of the image coding device 100 according to the embodiment.

Hereinafter, the transform/quantization unit 131 of the image coding device 110 according to the present embodiment will be described with reference to FIG. 3. FIG. 3 is a diagram illustrating an example of functional blocks of the transform/quantization unit 131 of the image coding device 110 according to the present embodiment.

As illustrated in FIG. 13, the transform/quantization unit 131 includes a primary transform unit 131A, a secondary transform unit 131B, and a quantization unit 131C.

The transform/quantization unit 131 is an example of a transform/quantization unit configured to generate the coefficient level value from the prediction residual signal by transform/quantization.

The primary transform unit 131A is configured to generate a primary transform coefficient of the target block by using the prediction residual signal as an input.

Here, a base pattern (transformation matrix) used for primary transform processing may be selected from a plurality of base patterns. For example, in Non Patent Literature 1, base patterns corresponding to DCT2, DCT8, and DST7 are used. Furthermore, as a method of selecting the base pattern, for example, there is a method in which a base pattern having the lowest coding cost is selected by the image coding device 100, and the selected base pattern is transmitted to the image decoding device 200 as side information.

The secondary transform unit 131B is configured to determine whether or not to apply secondary transform to the target block, by using the primary transform coefficient from the primary transform unit 131A as an input.

Here, the secondary transform unit 131B is configured to generate a secondary transform coefficient by executing transform processing on the primary transform coefficient and output the secondary transform coefficient to the quantization unit 131C in a case where the secondary transform unit 131B determines to apply the secondary transform.

On the other hand, the secondary transform unit 131B is configured to output the primary transform coefficient to the quantization unit 131C as it is in a case where the secondary transform unit 131B determines not to apply the secondary transform.

Furthermore, the secondary transform unit 131B is configured to output information regarding whether or not to apply the secondary transform (hereinafter, a secondary transform index) to the coding unit 140.

The quantization unit 131C is configured to determine whether or not to apply quantization to the transform coefficient of the target block by using the transform coefficient (primary transform coefficient or secondary transform coefficient) as an input.

Here, the quantization unit 131C is configured to generate a quantization index in a case where the quantization unit 131C determines to apply the quantization. Note that a known method can be used as a method of determining whether or not to apply the quantization and a method of generating the quantization index, and thus the details thereof are omitted.

(Coding Unit 140)

The coding unit 140 may be configured to code the coefficient level value by using a context optimized for an application probability of the secondary transform in a case where the secondary transform is applied.

Since the inverse transform/inverse quantization unit 132 performs the same operation as that of an inverse transform/inverse quantization unit 220 in the image decoding device 200 to be described later, the details will be described later in a description of the inverse transform/inverse quantization unit 220, and hereinafter, the inverse transform/inverse quantization unit 132 and the inverse transform/inverse quantization unit 220 are treated the same.

Figure 4:
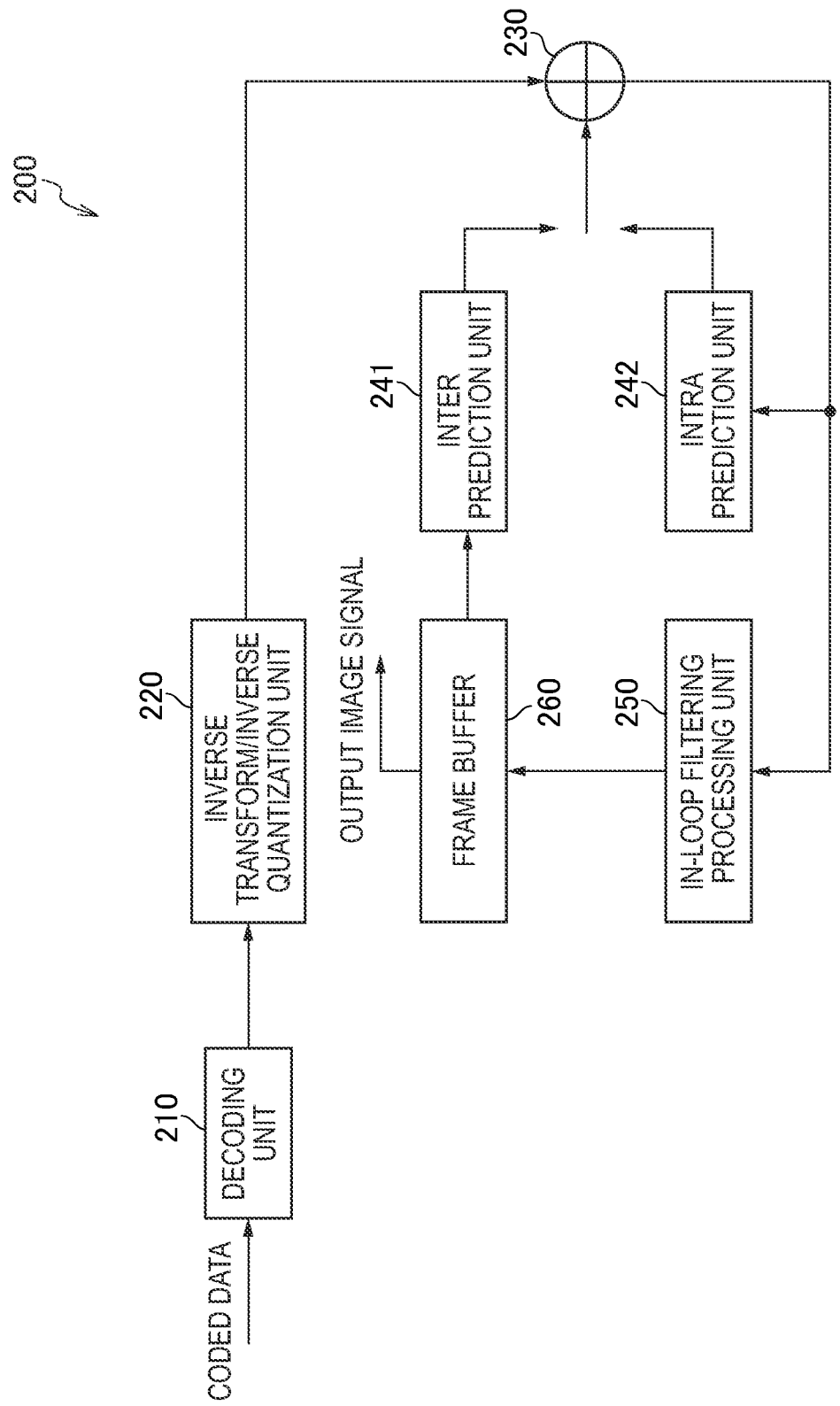
FIG. 4 is a diagram illustrating an example of functional blocks of an image decoding device 200 according to the embodiment.

Hereinafter, the image decoding device 200 according to the present embodiment will be described with reference to FIG. 4. FIG. 4 is a diagram illustrating an example of functional blocks of the image decoding device 200 according to the present embodiment.

As illustrated in FIG. 4, the image decoding device 200 includes a decoding unit 210, an inverse transform/inverse quantization unit 220, an adder 230, an inter prediction unit 241, an intra prediction unit 242, an in-loop filtering processing unit 250, and a frame buffer 260.

The decoding unit 210 is configured to decode the coded data generated by the image coding device 100 and decode the coefficient level value.

Here, the decoding is, for example, decoding of data subjected to entropy coding in which codes of different lengths are assigned based on the probability of generation of the coefficient. The decoding is entropy decoding performed in a reverse procedure to the entropy coding performed by the coding unit 140.

Furthermore, the decoding unit 210 may be configured to acquire control data by decoding processing for the coded data.

Note that, as described above, the control data may include size data such as a coding block size, a prediction block size, and a transform block size.

The inverse transform/inverse quantization unit 220 is configured to generate the prediction residual signal by performing inverse quantization of the quantization index output from the decoding unit 210 and inverse transform processing of the coefficient level value output from the decoding unit 210.

The adder 230 is configured to add the prediction signal to the prediction residual signal output from the inverse transform/inverse quantization unit 220 to generate a pre-filtering decoded signal, and output the pre-filtering decoded signal to the intra prediction unit 242 and the in-loop filtering processing unit 250.

Here, the pre-filtering decoded signal constitutes a reference block used by the intra prediction unit 242.

Similarly to the inter prediction unit 111, the inter prediction unit 241 is configured to generate a prediction signal by inter prediction (inter-frame prediction).

Specifically, the inter prediction unit 241 is configured to generate the prediction signal for each prediction block based on the motion vector decoded from the coded data and the reference signal included in the reference frame. The inter prediction unit 241 is configured to output the prediction signal to the adder 230.

Similarly to the intra prediction unit 112, the intra prediction unit 242 is configured to generate a prediction signal by intra prediction (intra-frame prediction).

Specifically, the intra prediction unit 242 is configured to specify the reference block included in the target frame, and generate the prediction signal for each prediction block based on the specified reference block. The intra prediction unit 242 is configured to output the prediction signal to the adder 230.

Similarly to the in-loop filtering processing unit 150, the in-loop filtering processing unit 250 is configured to execute filtering processing on the pre-filtering decoded signal output from the adder 230 and output the filtered decoded signal to the frame buffer 260.

Here, for example, the filtering processing is deblocking filtering processing for reducing distortion occurring at a boundary portion of a block (the coding block, the prediction block, the transform block, or a sub-block obtained by dividing them).

Similarly to the frame buffer 160, the frame buffer 260 is configured to accumulate the reference frames used by the inter prediction unit 241.

Here, the filtered decoded signal constitutes the reference frame used by the inter prediction unit 241.

Figure 5:
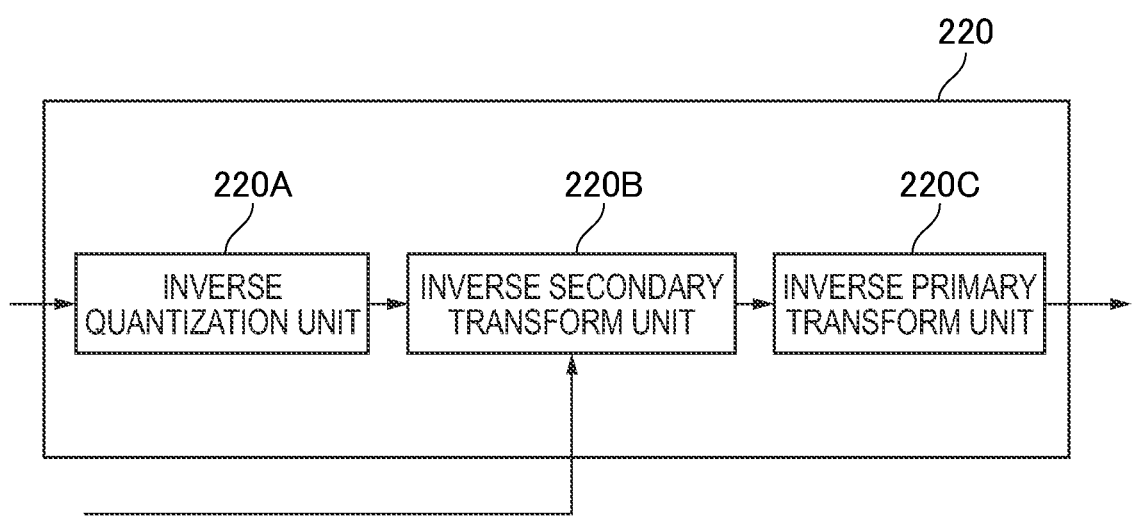
FIG. 5 is a diagram illustrating an example of functional blocks of an inverse transform/inverse quantization unit 220 of the image decoding device 200 according to the embodiment.

Hereinafter, the inverse transform/inverse quantization unit 220 of the image decoding device 200 according to the present embodiment will be described with reference to FIG. 5. FIG. 5 is a diagram illustrating an example of functional blocks of the inverse transform/inverse quantization unit 220 of the image decoding device 200 according to the present embodiment.

As illustrated in FIG. 5, the inverse transform/inverse quantization unit 220 includes an inverse quantization unit 242A, an inverse secondary transform unit 242B, and an inverse primary transform unit 242C.

The inverse quantization unit 220A is configured to generate the transform coefficient of the target block by using the quantization index as an input signal. A known method can be used as a method of generating the coefficient level value from the quantization index, and thus the details are omitted.

The inverse secondary transform unit 220B is configured to determine whether or not to apply inverse secondary transform to the target block by using the coefficient level value as an input.

Here, the inverse secondary transform unit 220B is configured to generate the primary transform coefficient by executing inverse transform processing on the input coefficient level value, and output the primary transform coefficient to the primary transform coefficient unit 220C in a case where the inverse secondary transform unit 220B determines to apply the inverse secondary transform.

On the other hand, in a case where the inverse secondary transform unit 220B determines not to apply the secondary transform, the inverse secondary transform unit 220B is configured to directly output the input coefficient level value as the primary transform coefficient to the primary transform coefficient unit 220C.

Hereinafter, in order to simplify the description, the secondary transform and the inverse secondary transform are collectively referred to as the secondary transform, and the secondary transform in the inverse secondary transform unit is appropriately read as the inverse secondary transform.

Note that a method of determining whether or not to apply the secondary transform by the inverse secondary transform unit 220B will be described later.

The inverse primary transform unit 220C is configured to generate the prediction residual signal of the target block by using the primary transform coefficient as an input.

Here, a base pattern (transformation matrix) used for inverse primary transform processing may be selected from a plurality of specified patterns, similarly to a case of the image coding device 100. The selection of the base pattern may be performed using, for example, the side information transmitted from the image coding device 100 (base pattern information selected by the image coding device 100).

Hereinafter, an example of the secondary transform performed by the image coding device 100 and the image decoding device 200 according to the present embodiment will be described with reference to FIG. 6.

As described above, the secondary transform is a technique of transforming the primary transform coefficient of the target block again before quantization. By transforming the primary transform coefficient again before quantization, coefficients whose coefficient level values are not zero (hereinafter, referred to as non-zero coefficients) are more likely to be concentrated in a low frequency region, and coefficients whose coefficient level values are zero (hereinafter, referred to as zero coefficients) are continuous in coefficient scanning processing to be described later. Therefore, an effect of further improving coding by the entropy coding can be expected.

Here, similarly to the primary transform, the secondary transform may use a plurality of base patterns (transformation matrices). For example, as in Non Patent Literature 2, a usable base pattern may be set in advance according to a target block size, an intra prediction mode, and the secondary transform index. In a case where a value of the secondary transform index is 0, the secondary transform is disabled. On the other hand, in a case where the value is 1 or more, the secondary transform is enabled. Furthermore, two types of base patterns may be adaptively selected according to the secondary transform index, for example, as in Non Patent Literature 2.

Furthermore, an application range of the secondary transform may be adaptively set according to the block size of the target block. For example, FIG. 6 illustrates an example of the application range of the secondary transform in CE6: Reduced Secondary Transform (RST) (CE6-3.1), JVET-N019.

As illustrated in FIG. 6(*a*), in a case where the block size of the target block is 8×8 pixels, an application range R1 of the secondary transform is set for all of 64 primary transform coefficients, a generation region R2 of the non-zero coefficient after the secondary transform is limited to the low frequency region (4×2 pixels) of the secondary transform coefficient, and all the other regions are set for the zero coefficients (hereinafter, referred to as zeroing).

On the other hand, as illustrated in FIG. 6(*b*), in a case where the block size of the target block is M×N (where M>8 and N>8) pixels, the application range R1 of the secondary transform is for 48 primary transform coefficients in the low frequency region. That is, the secondary transform is not applied to 48 primary transform coefficients in the low frequency region, and the primary transform coefficients are handled as they are. Furthermore, the region where the non-zero coefficient after the secondary transform is generated is limited to the low frequency region (4×4 pixels) of the secondary transform coefficient, and the other regions are zeroed.

Hereinafter, a method of coding the coefficient level value will be described with reference to FIG. 7. FIG. 7 is a diagram illustrating a method of scanning the coefficient level value of the target block.

As a coefficient scanning method, for example, as disclosed in Versatile Video Coding (Draft 5), JVET-N 1001, a method of scanning from a coefficient C1 of the highest frequency component of the target block to a coefficient Cx of the lowest frequency component in an upper-left direction (hereinafter, referred to as oblique scanning) may be used (see FIG. 7).

In a natural image, the non-zero coefficient is less likely to be generated in a high frequency region. Therefore, by performing the oblique scanning from a high-frequency component to a low-frequency component, the zero coefficients can be continuously arranged, and an effect of improving coding performance by entropy coding can be expected.

Furthermore, the oblique scanning may be performed in units of sub-blocks obtained by dividing the target block into 4×4 pixels as in Versatile Video Coding (Draft 5), JVET-N 1001. Furthermore, the image coding device 100 may transmit a flag (coded_sub_block_flag) indicating the presence or absence of the non-zero coefficient to the image decoding device 200 according to the number of generated non-zero coefficient in units of sub-blocks.

Here, the reason for using such a flag (coded_sub_block_flag) is that, for example, a 1-bit flag (coded_sub_block_flag) can be used to code and decode a sub-block having no non-zero coefficient.

Furthermore, before coding such a flag (coded_sub_block_flag), the image coding device 100 may execute processing of determining whether or not the non-zero coefficient is generated from the sub-block in which the non-zero coefficient is first generated in scanning order.

Here, the image coding device 100 may transmit, to the image decoding device 200, position information (last_coeff_pos) in which the non-zero coefficient is first generated. As a result, since it is certain that there is no non-zero coefficient in the sub-block before generation of the first non-zero coefficient, transmission of the above-described flag (coded_sub_block_flag) is unnecessary, and a code amount can be decreased.

Note that the image coding device 100 may code an x coordinate value and a y coordinate value of the position information in which the non-zero coefficient is first generated in the target block by dividing the x coordinate value and the y coordinate value into a prefix portion and a suffix portion, for example, as in Versatile Video Coding (Draft 5), JVET-N 1001.

Figure 8:
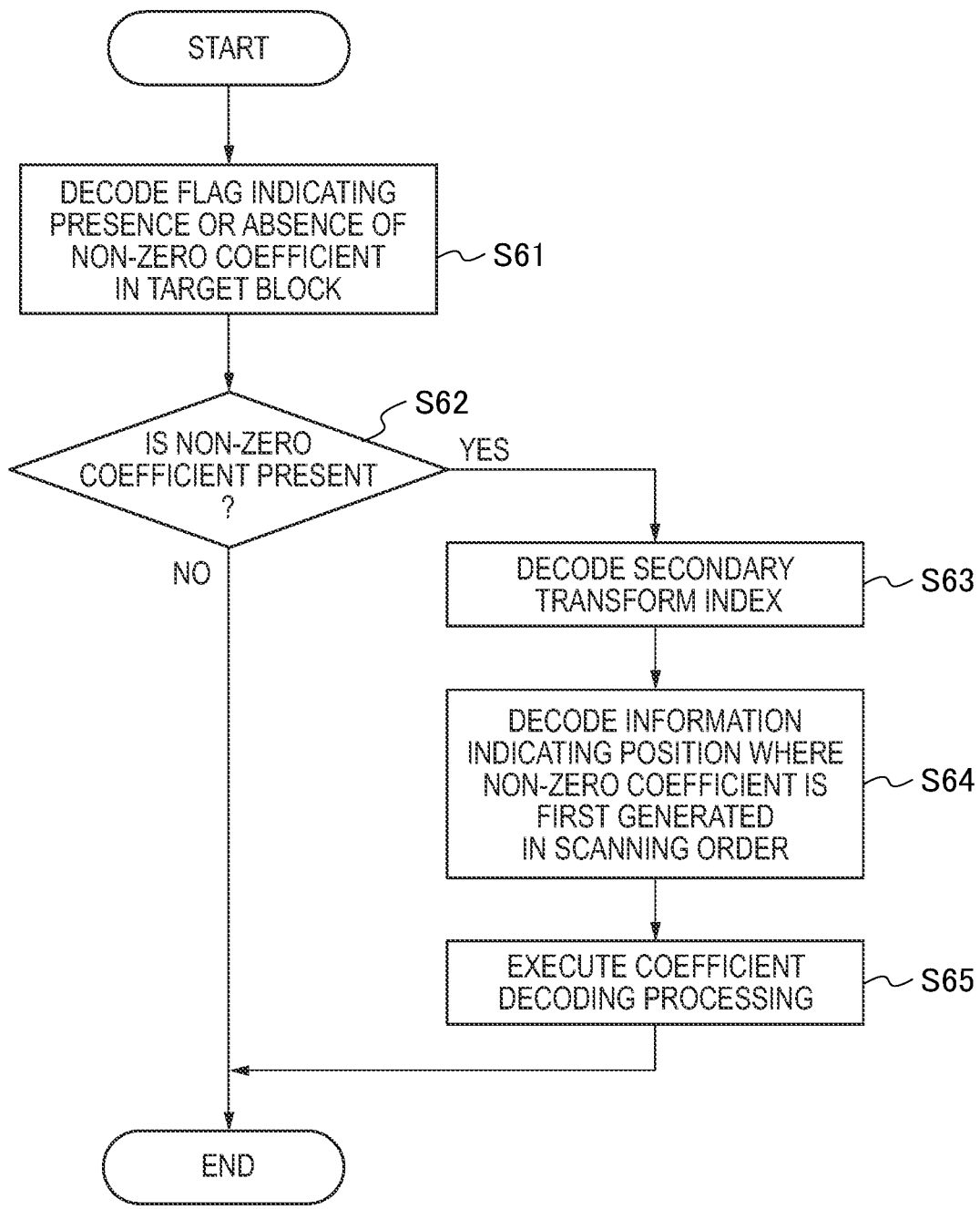
FIG. 8 is a flowchart illustrating an example of a method of determining whether or not to apply secondary transform and a coefficient decoding method in the image decoding device 200 according to a first embodiment.
Figure 9:
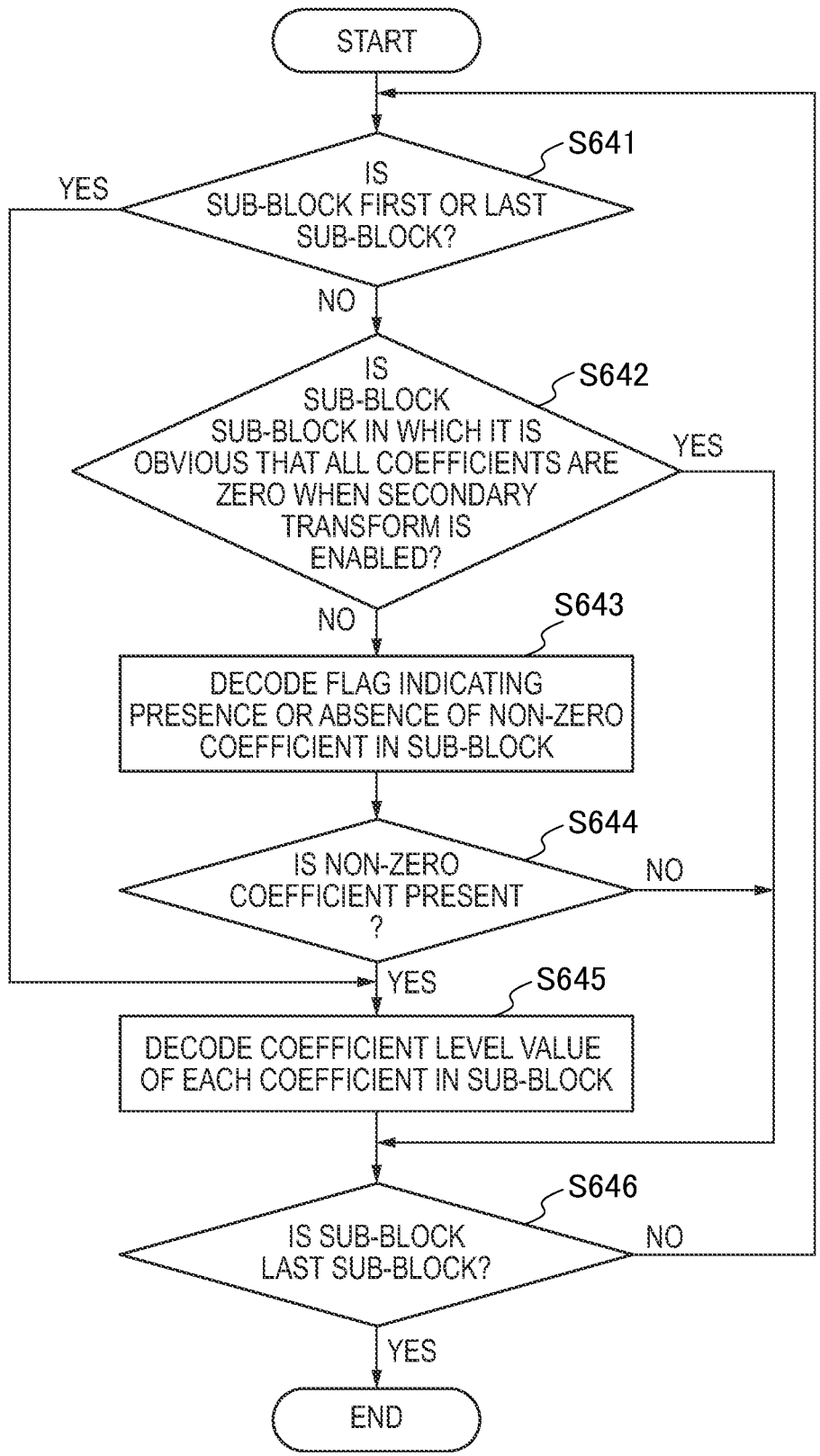
FIG. 9 is a flowchart illustrating an example of the method of determining whether or not to apply the secondary transform and the coefficient decoding method in the image decoding device 200 according to the first embodiment.

FIGS. 8 and 9 are flowcharts illustrating an example of a method of determining whether or not to apply the secondary transform and the coefficient decoding method in the image decoding device 200. Hereinafter, an example of the method of determining whether or not to apply the secondary transform will be described with reference to FIG. 8, and an example of the coefficient decoding method will be described with reference to FIG. 9.

As illustrated in FIG. 8, in Step S61, the image decoding device 200 decodes a flag (cbf) indicating the presence or absence of the non-zero coefficient in the target block. Here, a value of cbf is either 0 or 1.

In Step S62, the image decoding device 200 determines whether or not the non-zero coefficient is present based on cbf.

In a case where the image decoding device 200 determines that the non-zero coefficient is not present (the number of non-zero coefficients is 0) (that is, in a case where the image decoding device 200 determines that cbf=0), the processing ends.

On the other hand, in a case where the image decoding device 200 determines that the non-zero coefficient is present (the number of non-zero coefficients is one or more) (that is, in a case where the image decoding device 200 determines that cbf=1), the processing proceeds to Step S63.

Here, cbf may be decoded as a different flag for each of a luminance signal (Y signal) and chrominance signals (Cb signal and Cr signal). In this case, the image decoding device 200 may make the following determination in a case where block division tree structures of the luminance signal and the chrominance signal of the target block are different (dual tree) and in a case where both are the same (single tree).

The image decoding device 200 may determine to proceed to Step S63 in a case where cbf=1 for the Y signal in a case of the dual tree, and otherwise, may end the processing.

The image decoding device 200 may determine to proceed to Step S63 in a case where cbf for at least one of the Cb/Cr signals in a case of the dual tree is 1, and otherwise, may end the processing.

In a case where cbf for at least one of the Y signal, the Cb signal, or the Cr signal in a case of the single tree is 1, the image decoding device 200 may determine to proceed to Step S63, and otherwise, may determine to end the processing.

In Step S63, the image decoding device 200 decodes the secondary transform index (lfnst_idx).

In Step S64, the image decoding device 200 decodes information (last_coeff_pos) indicating the position where the first non-zero coefficient is generated in the target block in scanning order.

In Step S65, the image decoding device 200 executes the coefficient decoding processing (see FIG. 9). Note that the image decoding device 200 executes the coefficient decoding processing in units of sub-blocks obtained by dividing the target block described above.

As illustrated in FIG. 9, in Step S641, the image decoding device 200 determines whether or not the sub-block in which the non-zero coefficient is generated first is the first or last sub-block in scanning order in the target block.

In a case where the image decoding device 200 determines that the sub-block is either the first sub-block or the last sub-block, it is obvious that the non-zero coefficient is present in the sub-block, and thus the processing proceeds to Step S645.

In a case where the image decoding device 200 determines that the sub-block is neither the first sub-block nor the last sub-block, in Step S642, the image decoding device 200 determines whether or not the secondary transform is applied to the sub-block based on the secondary transform index (st_idx).

In a case where the image decoding device 200 determines that the secondary transform is applied to such a sub-block (the secondary transform is enabled), and in a case where it is obvious that all the coefficients are zero (zeroing) due to the secondary transform in such a sub-block, decoding of coded_sub_block_flag is unnecessary, and thus the processing proceeds to Step S646.

On the other hand, in a case where the image decoding device 200 determines that the secondary transform is not applied to such a sub-block (the secondary transform is not enabled), or in a case where there remains a possibility that the non-zero coefficient is generated even in a case where the secondary transform is applied to such a sub-block, the processing proceeds to Step S643.

Note that the order of Step S641 and Step S642 may be switched.

In Step S643, the image decoding device 200 decodes the flag (coded_sub_block_flag) indicating the presence or absence of the non-zero coefficient.

In Step S644, the image decoding device 200 determines the presence or absence of the non-zero coefficient in the sub-block based on coded_sub_block_flag.

In a case where the value of coded_sub_block_flag is 0, the image decoding device 200 determines that the non-zero coefficient is not present, and the processing proceeds to Step S646.

On the other hand, in a case where the value of coded_sub_block_flag is 1, the image decoding device 200 determines that the non-zero coefficient is present, and the processing proceeds to Step S645.

In Step S645, the image decoding device 200 decodes the level value of each coefficient in the sub-block.

In Step S646, the image decoding device 200 determines whether or not the sub-block to be processed is the last block.

In a case where the image decoding device 200 determines that the block is not the last block, the processing proceeds to Step S641, and is resumed for the next sub-block in scanning order. In a case where the image decoding device 200 determines that the block is the last block, the processing ends.

By using the above-described method of determining whether or not to apply the inverse secondary transform and the coefficient decoding method, the following two effects can be expected.

First, by decoding the secondary transform index before the processing of decoding the coefficient of the target block, the processing of decoding the coefficient necessary for the determination of whether or not the secondary transform is applied in the conventional technique can be omitted.

Specifically, in the conventional technique, it is necessary to use two counters (a counter for measuring the number of non-zero coefficients generated in the target block and a counter for counting the number of non-zero coefficients generated in a region where it is obvious that the zero coefficient is generated when the secondary transform is enabled) for determining whether or not to apply the secondary transform, but both of them can be omitted by introducing the technique according to the present embodiment.

Second, in the conventional technique, when the secondary transform is enabled, coded_sub_block_flag needs to be redundantly decoded or coded for the sub-block in which it is obvious that all the coefficients are zero in the block to be subjected to the secondary transform. On the other hand, in a case where the technique according to the present embodiment is used, such processing can be omitted, such that improvement in coding performance can be expected.

Modified Example 1

Hereinafter, Modified Example 1 of the first embodiment described above will be described focusing on differences from the above-described first embodiment with reference to FIG. 10.

Figure 10:
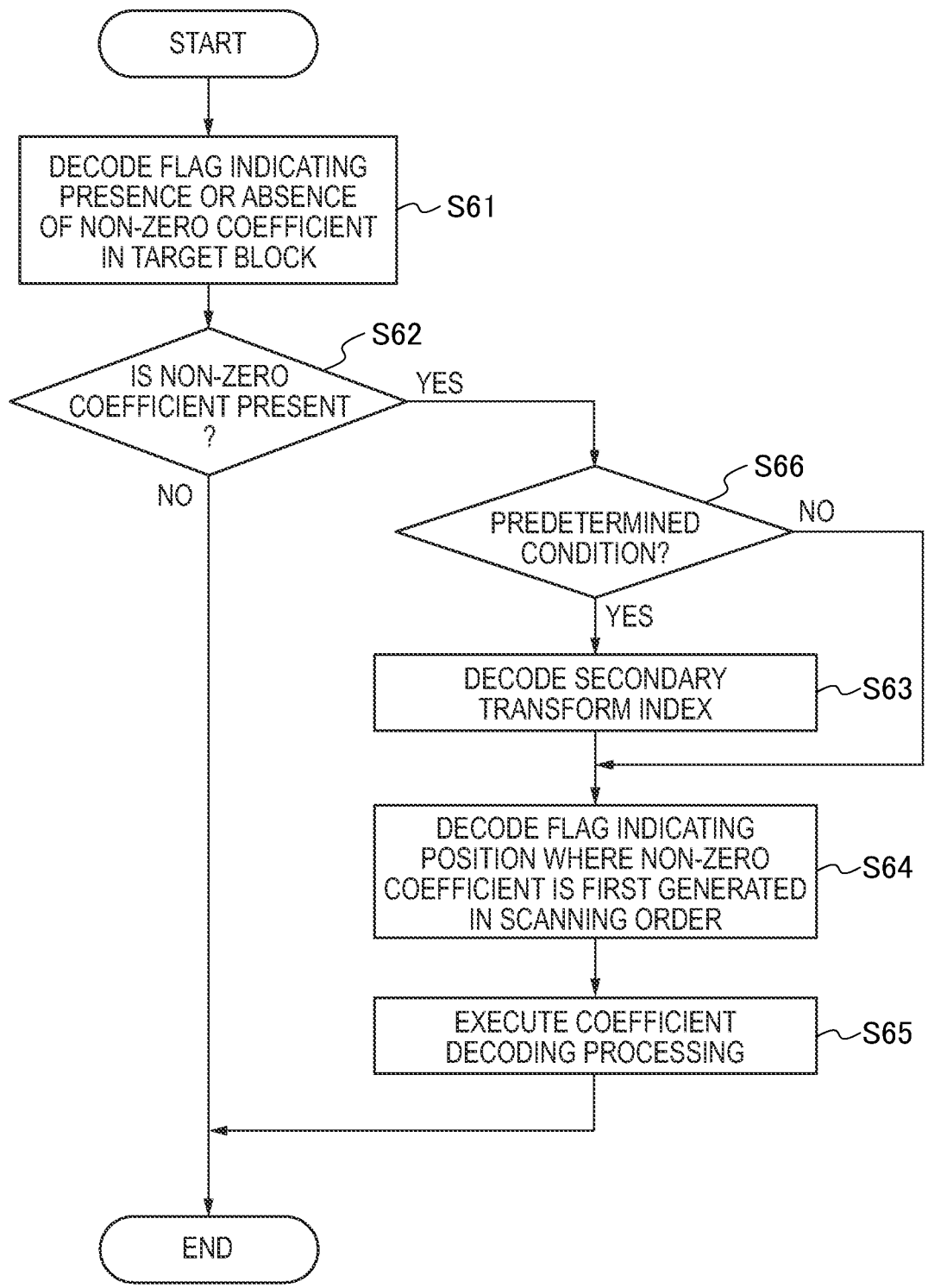
FIG. 10 is a flowchart illustrating an example of a method of determining whether or not to apply secondary transform and a coefficient decoding method in the image decoding device 200 according to Modified Example 1 of the first embodiment.

In the flowchart illustrated in FIG. 10, Step S66 that does not exist in the flowchart illustrated in FIG. 8 is added before Step S63.

Here, in a case where the secondary transform is not obviously enabled, transmission of the secondary transform index becomes redundant, and thus, in FIG. 10, Step S66 is added.

For example, in a case where an application target of the secondary transform is limited to an intra picture or an intra block, determination of whether or not the target block is an intra picture or an intra block may be added to the predetermined condition.

In addition, in a case where one coding block is divided into a plurality of prediction blocks or transform blocks, the number of transform blocks to which the secondary transform is applied increases, and thus, improvement in coding performance can be expected, but a delay of the coding processing and the decoding processing can also increase.

Therefore, as the predetermined condition, for example, in a case where intra prediction (intra subdivision prediction) performed by dividing the coding block into a plurality of blocks as described in Non Patent Literature 1 is enabled, the secondary transform is disabled, such that it is possible to suppress an unintended increase in processing delay. Therefore, determination of whether or not the intra subdivision prediction is applied to the target block may be added to the predetermined condition.

Modified Example 2

Hereinafter, Modified Example 2 of the first embodiment described above will be described focusing on differences from the first embodiment and Modified Example 1 described above.

In the first embodiment described above, as illustrated in FIG. 8, an example in which decoding of the secondary transform index is performed in units of coding blocks has been described.

In Modified Example 2, in a case where the coding block is divided into a plurality of transform blocks, the decoding of the secondary transform index may be performed in units of transform blocks.

With such a configuration, the secondary transform index can be decoded in units of different transform blocks, such that the number of blocks to which the secondary transform is applied increases, and improvement in coding performance can thus be expected.

Second Embodiment

Hereinafter, a second embodiment of the present invention will be described focusing on differences from the first embodiment described above with reference to FIG. 11.

In the present embodiment, as illustrated in FIG. 11, a method of decoding position information (last_coeff_pos) in which the non-zero coefficient is first generated in the target block according to whether or not to apply the secondary transform is controlled.

The present embodiment is different from the first embodiment 1 described above in regard to the method of decoding last_coeff_pos (see FIG. 8). Since the present embodiment has the same configuration as that of the first embodiment described above for the other parts, a description thereof will be omitted.

For example, in Non Patent Literature 2, in a case where the target block size of a block for which the secondary transform is enabled is 4×4 or 8×8, the generation position and the number of non-zero coefficients in a region which is a secondary transform target are limited to the left-uppermost sub-block and eight, respectively.

At this time, the generation position of the non-zero coefficient can be specified as illustrated in FIG. 11 in consideration of a scanning order of the sub-blocks.

In other words, in a case where the secondary transform is enabled, last_coeff_pos cannot indicate the scanning order 8 to 15 illustrated in FIG. 11.

Therefore, last_coeff_pos is usually decoded by the prefix and the suffix of each of the x coordinate value and the y coordinate value, but in a case where the secondary transform is enabled and the generation position and the number of non-zero coefficients in the target block are limited, the method of decoding last_coeff_pos may be corrected as follows.

For example, last_coeff_pos can be transmitted with a 3-bit index in coefficient scanning order in a range of 0 to 7 in which the non-zero coefficient may be generated.

In the conventional technique, since the x coordinate value and the y coordinate value are expressed by two bits for each sub-block, the code amount can decrease accordingly, and as a result, the effect of improving the coding performance can be expected.

Hereinafter, a third embodiment of the present invention will be described focusing on differences from the first and second embodiments described above with reference to FIGS. 12 and 13.

The present embodiment is different from the first embodiment 1 in regard to the method of determining whether or not to apply the secondary transform and the coefficient decoding method (see FIG. 8). Since the present embodiment has the same configuration as that of the first embodiment described above for the other parts, a description thereof will be omitted.

Figure 12:
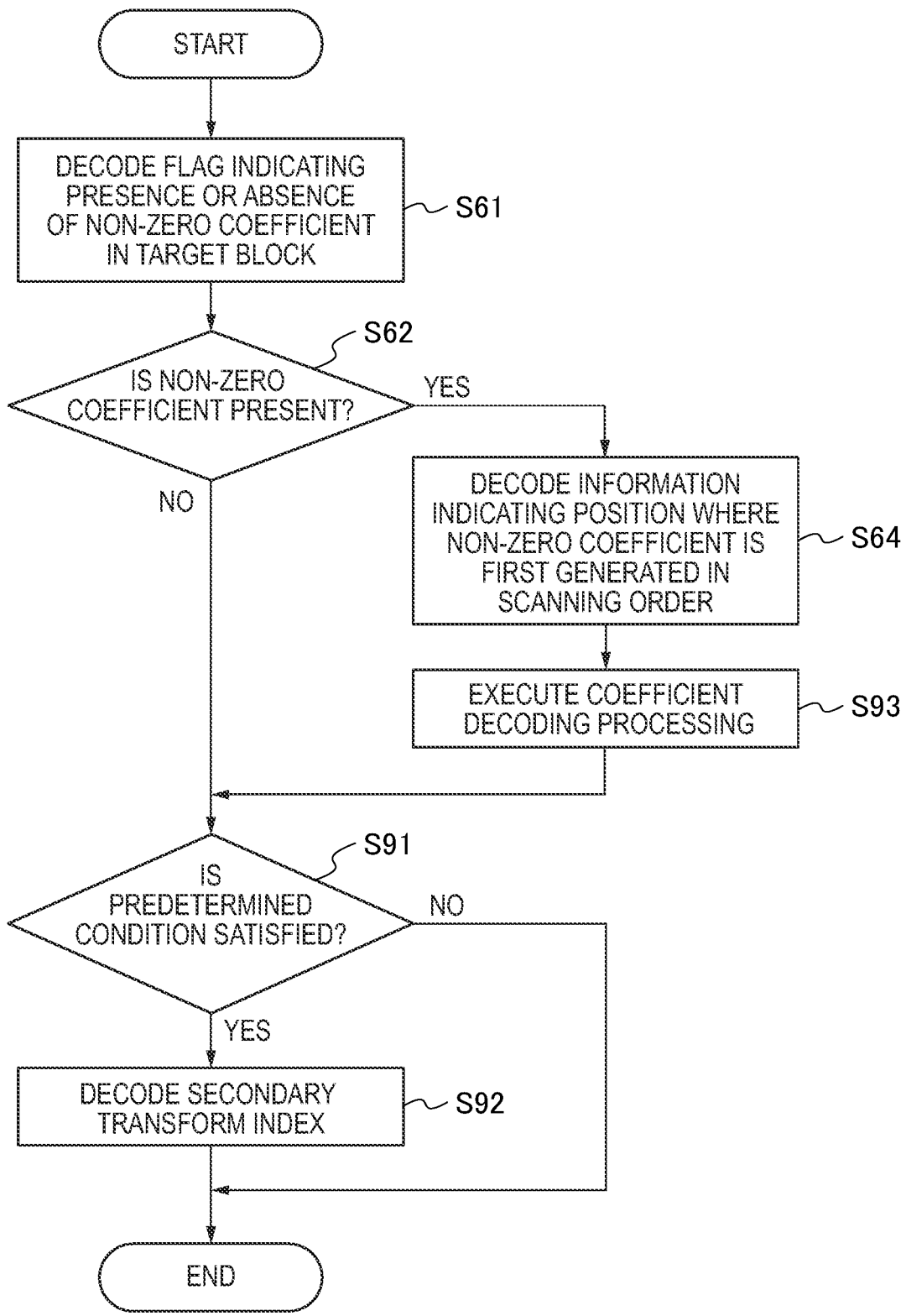
FIG. 12 is a flowchart illustrating an example of a method of determining whether or not to apply secondary transform and a coefficient decoding method in an image decoding device 200 according to a third embodiment.

FIGS. 12 and 13 are flowcharts illustrating an example of the method of determining whether or not to apply the secondary transform and the coefficient decoding method in the image decoding device 200 according to the present embodiment. Hereinafter, an example of an operation of an image decoding device 200 according to the present embodiment will be described using the flowcharts.

As illustrated in FIG. 12, in Step S61, the image decoding device 200 decodes a flag (cbf) indicating the presence or absence of the non-zero coefficient in the target block, similarly to Step S61 illustrated in FIG. 8.

In Step S62, the image decoding device 200 determines whether or not the non-zero coefficient is present based on cbf, similarly to Step S62 illustrated in FIG. 8.

In a case where the image decoding device 200 determines that the non-zero coefficient is not present (the number of non-zero coefficients is 0) (that is, in a case where the image decoding device 200 determines that cbf=0), the processing proceeds to Step S91.

On the other hand, in a case where the image decoding device 200 determines that the non-zero coefficient is present (the number of non-zero coefficients is one or more) (that is, in a case where the image decoding device 200 determines that cbf=1), the processing proceeds to Step S64.

In Step S64, the image decoding device 200 decodes information (last_coeff_pos) indicating the position where the first non-zero coefficient is generated in the target block in scanning order, similarly to Step S64 illustrated in FIG. 8.

In Step S93, the image decoding device 200 executes the coefficient decoding processing illustrated in FIG. 13. The coefficient decoding processing illustrated in FIG. 13 is similar to the coefficient decoding processing illustrated in FIG. 9 except that Step S642 illustrated in FIG. 9 is not included.

In Step S91, the image decoding device 200 determines whether or not a predetermined condition described later is satisfied. In a case where the image decoding device 200 determines that the predetermined condition is satisfied, the operation proceeds to Step S92, and in a case where the image decoding device 200 determines that the predetermined condition is not satisfied, the operation ends.

Here, the predetermined condition may be a condition for determining whether or not to decode the secondary transform index according to the target block size.

For example, in a case where the image decoding device 200 determines that at least one of the width or the height of the target coding block is larger than 64 in Step S91, the image decoding device 200 may determine not to decode the secondary transform index in Step S92. Effects of such determination are as follows.

In Algorithm description for Versatile Video Coding and Test Model 5 (VTM 5), JVET-N 1002, a tool for maintaining a pipeline processing unit of a decoder called a virtual pipeline data unit (VPDU) is adopted. Here, in Algorithm description for Versatile Video Coding and Test Model 5 (VTM 5), JVET-N 1002, a size of the VPDU is set to 64×64 pixels, and the maximum value of the width and height of the transform block is set to 64 pixels.

Therefore, in a case where either the width or the height of the target coding block is larger than 64 pixels, division is performed so that the width and the height of the transform block are 64 pixels or less.

For example, in a case where the coding block size is 128×128 pixels, four transform blocks of 64×64 pixels are included in the coding block. Since the maximum size of the transform block and the size of the VPDU are defined to be the same, it is possible to maintain pipeline processing defined by the VPDU by executing processing for each transform block.

In a case where a plurality of transform blocks are included in the coding block, the image decoding device 200 performs Step S91 after performing Steps S61, S62, S64, and S93 illustrated in FIG. 12 for all the transform blocks.

Therefore, when at least one of the width or the height of the coding block is larger than 64 pixels, it is necessary to wait for the processing of all the VPDUs constituting the target block to be completed in order to perform the control of decoding of the secondary transform index, and thus, the pipeline processing of the decoder is delayed.

Therefore, as described above, in a case where decoding of the secondary transform index is restricted, an effect of avoiding this processing delay can be expected.

Furthermore, the predetermined condition may be a condition for determining whether or not to perform decoding of the secondary transform index determined using generation position information (last_coeff_pos) of the non-zero coefficient or a flag (coded_sub_block_flag) indicating whether or not the non-zero coefficient is generated in the target sub-block.

For example, the predetermined condition may include a condition that last_coeff_pos or coded_sub_block_flag does not indicate the presence of the non-zero coefficient in a region where the non-zero coefficient cannot be generated in a case where the region where the non-zero coefficient is generated at the time of applying the secondary transform is limited as in a case where the target block is 4×4 pixels or 8×8 pixels as described in CE6: Reduced Secondary Transform (RST) (CE6-3.1), JVET-N0193.

For example, the predetermined condition may include a condition that cbf of the target block is not zero or that last_coeff_pos of the target block does not indicate a direct current (DC) component.

Note that the determination based on last_coeff_pos and cbf may be made as follows in a case where the block division tree structures of the luminance signal (Y signal) and the chrominance signals (Cb signal and Cr signal) of the target block are different (dual tree) and in a case where both are the same (single tree).

In a case where last_coeff_pos is the DC component or cbf is 0 for the Y signal in a case of the dual tree, the image decoding device 200 does not decode the secondary transform index.

In a case where last_coeff_pos is the DC component or cbf is 0 for both the Cb/Cr signals and the Cb/Cr signals in a case of the dual tree, the image decoding device 200 does not decode the secondary transform index.

In a case where last_coeff_pos is the DC component or cbf is 0 for all of the Y signal, the Cb signal, and the Cr signal in a case of the single tree, the image decoding device 200 does not decode the secondary transform index.

Alternatively, in a case where last_coeff_pos is the DC component or cbf is 0 for the Y signal in a case of the single tree, the image decoding device 200 does not have to decode the secondary transform index.

With such a configuration, it is possible to determine whether or not to decode the secondary transform index without depending on the values of cbf and last_coeff_pos for the Cb signal and the Cr signal.

In the above determination, in a case where the secondary transform index is not decoded, it is implicitly treated that the secondary transform index is 0 (that is, it is determined not to apply the secondary transform).

As described above, in a case where the region where the non-zero coefficient is generated when the secondary transform is applied is limited, when last_coeff_pos or coded_sub_block_flag indicates the presence of the non-zero coefficient in a region where the non-zero coefficient cannot be generated, it is clear that the secondary transform is not applied to the target block.

Therefore, for example, in the determination of the predetermined condition, in a case where the target block is 4×4 pixels or 8×8 pixels and last_coeff_pos or coded_sub_block_flag indicates the presence of the non-zero coefficient in a region where the non-zero coefficient cannot be generated, the code amount required for transmission of the secondary transform index can be reduced by not decoding the secondary transform index, and as a result, an effect of improving the coding performance can be expected.

In a case where last_coeff_pos indicates the DC component of the target block, the non-zero coefficient in the target block is only the DC component. On the other hand, the effect of the secondary transform is exerted in a case where the non-zero primary transform coefficient is also present in a high frequency component due to the nature that the secondary transform concentrates the non-zero primary transform coefficients. Therefore, in a case where the non-zero primary transform coefficient is only the DC component, the secondary transform does not have to be applied.

Therefore, for example, in a case where last_coeff_pos indicates the DC component in the target block, the code amount required for transmission of the secondary transform index can be reduced by determining not to decode the secondary transform index, and as a result, an effect of improving the coding performance can be expected.

Next, in a case where cbf of the target block is 0, as described above, since there is no non-zero coefficient in the target block, it is obvious that the secondary transform is not applied to the target block. Therefore, the code amount required for transmission of the secondary transform index can be reduced by determining not to decode the secondary transform index, and as a result, an effect of improving the coding performance can be expected.

In Step S92, the image decoding device 200 decodes the secondary transform index, and ends the operation.

Modified Example 3

Hereinafter, Modified Example 3 will be described focusing on differences from the third embodiment described above. In Modified Example 3, whether or not to decode the secondary transform index is determined using last_coeff_pos and coded_sub_block_flag.

In the third embodiment, when determining whether or not to decode the secondary transform index of the target block, in a case where last_coeff_pos and coded_sub_block_flag indicate the presence of the non-zero coefficient in a region where the generation of the non-zero coefficient is limited when the secondary transform is applied, it is determined not to decode the secondary transform index.

On the other hand, in Modified Example 3, for example, when the secondary transform is applied, in a case where all the high frequency components of the target block are zero (zeroed) for simplification of processing, the determination using coded_sub_block_flag is obviously unnecessary, and thus whether or not to decode the secondary transform may be determined only using last_coeff_pos.

Hereinafter, Modified Example 4 will be described focusing on differences from the third embodiment described above.

In the third embodiment, an example in which the determination of whether or not to decode the secondary transform index is performed in units of coding blocks has been described.

On the other hand, in Modified Example 4, in a case where the coding block is divided into a plurality of transform blocks, such determination may be performed in units of transform blocks. With such a configuration, by determining decoding of the secondary transform index in units of transform blocks, the number of target blocks to which the secondary transform is likely to be applied increases, and as a result, improvement in coding performance can be expected.

The foregoing image encoding device 100 and the image decoding device 200 may also be realized by a program that causes a computer to perform each function (each process).

Note that, in each of the foregoing embodiments, the present invention has been described by taking application to the image encoding device 100 and the image decoding device 200 by way of an example; however, the present invention is not limited only to such devices and can be similarly applied to encoding/decoding systems provided with each of the functions of an encoding device and a decoding device.

In the conventional method, it is necessary to perform additional processing of counting the number of non-zero coefficients in order to determine whether or not to apply the secondary transform at the time of decoding the coefficient. However, with the configuration as in the present invention, the additional processing becomes unnecessary, and an increase in processing speed or a decrease in loads can thus be expected.

Furthermore, according to the present invention, decoding of the secondary transform index can be omitted for a block to which the secondary transform is not applied or for which it can be determined that the effect is low, such that improvement in coding performance can be expected.

What is claimed is:

1. An image decoding device, wherein the image decoding device:
   generates a prediction residual signal by inverse transform;
   controls a method of decoding a secondary transform index of a target block according to information indicating a position where a non-zero coefficient is generated in the target block and to information indicating whether or not the target block is dual tree, and
   omits decoding the secondary transform index of the target block in a case where the information indicating the position where the non-zero coefficient is generated in the target block indicates a coefficient position of a direct current component of the target block.

2. An image decoding method comprising:
   generating a prediction residual signal by inverse transform, and
   controlling a method of decoding a secondary transform index of a target block according to information indicating a position where a non-zero coefficient is generated in the target block and to information indicating whether or not the target block is dual tree, wherein
   in the controlling, the secondary transform index of the target block is not decoded in a case where the information indicating the position where the non-zero coefficient is generated in the target block indicates a coefficient position of a direct current component of the target block.

3. A program stored on a non-transitory computer-readable medium, which when executed by a processor in a computer, causes the computer to function as an image decoding device, wherein the image decoding device:
   generates a prediction residual signal by inverse transform,
   controls a method of decoding a secondary transform index of a target block according to information indicating a position where a non-zero coefficient is generated in the target block and to information indicating whether or not the target block is dual tree, and
   omits decoding the secondary transform index of the target block in a case where the information indicating the position where the non-zero coefficient is generated in the target block indicates a coefficient position of a direct current component of the target block.

* * * * *